(12) United States Patent
Aihara

(10) Patent No.: US 11,587,566 B2
(45) Date of Patent: Feb. 21, 2023

(54) AGENT SYSTEM, TERMINAL DEVICE, AND COMPUTER READABLE RECORDING MEDIUM USING SPEECH INTERACTION FOR SERVICES

(71) Applicant: TOYOTA JIDOSHA KABUSHIKI KAISHA, Toyota (JP)

(72) Inventor: Satoshi Aihara, Shinjuku-ku (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 188 days.

(21) Appl. No.: 17/109,200

(22) Filed: Dec. 2, 2020

(65) Prior Publication Data

US 2021/0233527 A1    Jul. 29, 2021

(30) Foreign Application Priority Data

Jan. 23, 2020 (JP) .............................. JP2020-009343

(51) Int. Cl.
| | |
|---|---|
| G10L 15/22 | (2006.01) |
| G10L 15/08 | (2006.01) |
| G10L 15/26 | (2006.01) |
| H04L 67/12 | (2022.01) |

(52) U.S. Cl.
CPC .............. *G10L 15/22* (2013.01); *G10L 15/08* (2013.01); *G10L 15/26* (2013.01); *H04L 67/12* (2013.01)

(58) Field of Classification Search
CPC ......... G10L 15/22; G10L 15/08; G10L 15/26; H04L 67/12
USPC ....................................................... 704/235
See application file for complete search history.

(56) References Cited

U.S. PATENT DOCUMENTS

| | | | | |
|---|---|---|---|---|
| 8,456,671 | B2* | 6/2013 | Kiyoshige | .......... H04N 1/32529 |
| | | | | 709/224 |
| 9,564,129 | B2 | 2/2017 | Amano et al. | |
| 10,063,663 | B2* | 8/2018 | Burkhardt | ............... H04L 67/01 |
| 10,140,985 | B2* | 11/2018 | Shin | ........................ G06F 3/038 |
| 10,901,761 | B2* | 1/2021 | Chandrasekhar | ....... G06F 9/546 |
| 2016/0322048 | A1 | 11/2016 | Amano et al. | |
| 2020/0320994 | A1 | 10/2020 | Totsuka et al. | |

(Continued)

FOREIGN PATENT DOCUMENTS

| | | |
|---|---|---|
| JP | 2009-265278 A | 11/2009 |
| JP | 2018-189984 A | 11/2018 |

(Continued)

*Primary Examiner* — Susan I McFadden
(74) *Attorney, Agent, or Firm* — Oblon, McClelland, Maier & Neustadt, L.L.P.

(57) ABSTRACT

An agent system includes: a first server including a first processor including hardware; a second server including a second processor including hardware; and a third server including a third processor including hardware. The first processor is configured to output first content to a terminal device in response to a request from a user. The second processor is configured to output second content to the terminal device in response to a request from the user. The third processor is configured to acquire the second content from the second server when execution of the second content is requested by the user during execution of the first content acquired from the first server. The third processor is further configured to determine whether to execute the first content and the second content based on a competition processing policy set in advance.

20 Claims, 3 Drawing Sheets

(56) References Cited

U.S. PATENT DOCUMENTS

2021/0233516 A1* 7/2021 Takeshita ................ G10L 15/10
2021/0233536 A1* 7/2021 Aihara .................... G10L 15/22
2021/0233538 A1* 7/2021 Takeshita ................ G10L 17/06

FOREIGN PATENT DOCUMENTS

JP       2019-86535 A    6/2019
WO   WO 2019/087546 A    5/2019

\* cited by examiner

AGENT SYSTEM, TERMINAL DEVICE, AND COMPUTER READABLE RECORDING MEDIUM USING SPEECH INTERACTION FOR SERVICES

The present application claims priority to and incorporates by reference the entire contents of Japanese Patent Application No. 2020-009343 filed in Japan on Jan. 23, 2020.

BACKGROUND

The present disclosure relates to an agent system, a terminal device, and a computer readable recording medium.

Japanese Laid-open Patent Publication No. 2018-189984 discloses a speech interaction method for using a plurality of services through a single speech interaction agent. In this speech interaction method, in a case of using another service during utilization of a certain service, service interrupt processing such as interrupting one service and executing the other service is performed in such a manner that the services do not compete against each other.

SUMMARY

There is a need for an agent system, a terminal device, and a computer readable recording medium which are able to simultaneously use, even when a plurality of services is used through a plurality of speech interaction agents, the plurality of services across the plurality of speech interaction agents without causing the services to compete against each other According to one aspect of the present disclosure, there is provided an agent system including: a first server including a first processor including hardware, the first processor being configured to output first content to a terminal device in response to a request from a user; a second server including a second processor including hardware, the second processor being configured to output second content to the terminal device in response to a request from the user; and a third server including a third processor including hardware, the third processor being configured to acquire the second content from the second server when execution of the second content is requested by the user during execution of the first content acquired from the first server, and determine whether to execute the first content and the second content based on a competition processing policy set in advance.

DETAILED DESCRIPTION

An agent system, a terminal device, and a computer readable recording medium according to an embodiment of the present disclosure will be described with reference to the drawings. Note that components in the following embodiment include what may be easily replaced by those skilled in the art or what is substantially the same.

Configurations of the agent system and the terminal device according to the present embodiment will be described with reference to FIG. 1 and FIG. 2. The agent system, the terminal device, and the agent program according to the present embodiment are to provide a user with services of a plurality of speech interaction agents (hereinafter, referred to as "agent").

Here, the "user" is a person that uses services of a plurality of agents through the terminal device. The terminal device in the present embodiment is assumed to be an in-vehicle device mounted on a vehicle. Thus, the user is, for example, an occupant including a driver of the vehicle. Note that the terminal device is not limited to the in-vehicle device mounted on the vehicle, and may be an information terminal device owned by the user, for example. Examples of this information terminal device include a mobile phone, a tablet terminal, a wearable computer, and a personal computer.

Figure 1:
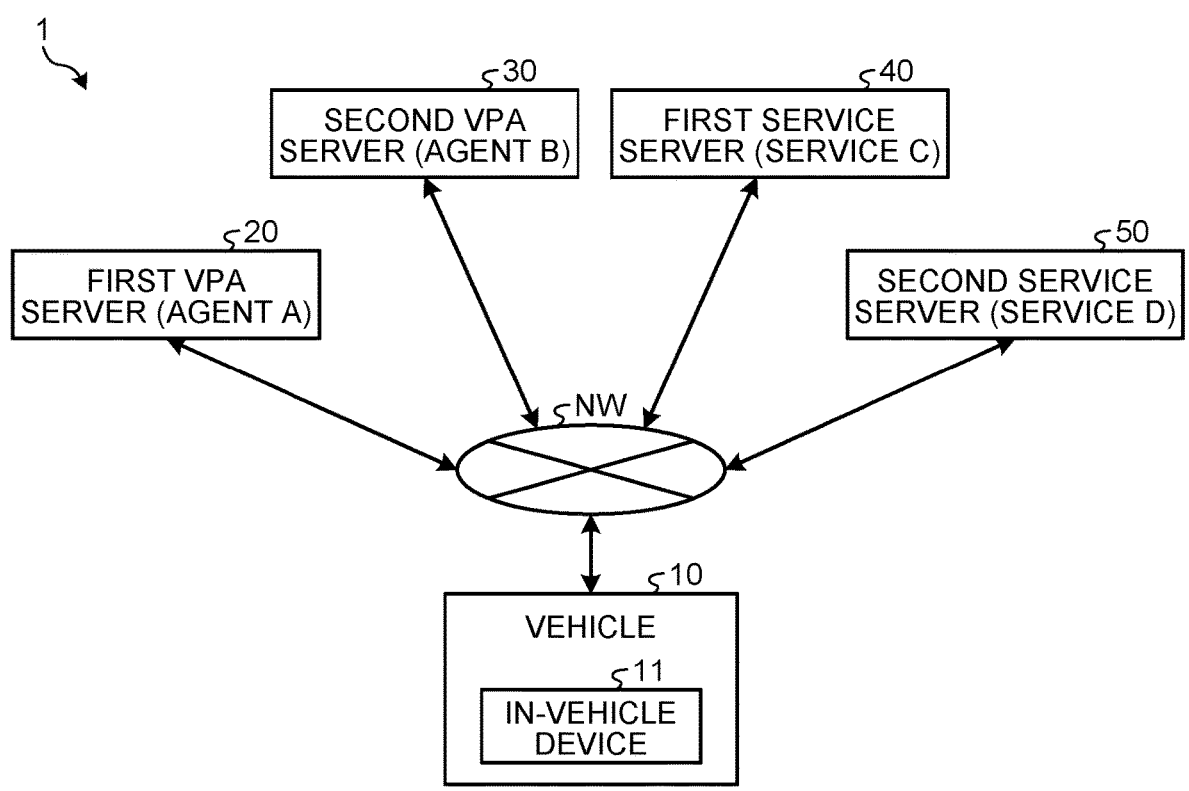
FIG. 1 is a view schematically illustrating an agent system and a terminal device according to an embodiment.

As illustrated in FIG. 1, an agent system 1 includes a vehicle 10 including an in-vehicle device 11, a first virtual personal assistant (VPA) server 20, a second VPA server 30, a first service server 40, and a second service server 50. The terminal device according to the present embodiment is specifically realized by the in-vehicle device 11. The vehicle 10, the first VPA server 20, the second VPA server 30, the first service server 40, and the second service server 50 may communicate with each other through a network NW. This network NW includes, for example, an Internet network, a mobile phone network, and the like.

Although the agent system 1 in the present embodiment uses two VPA servers, the number of VPA servers may be three or more. Also, in the present embodiment, the first VPA server 20 is a server device to realize a function of an agent A, and the second VPA server 30 is a server device to realize a function of an agent B. The agent A provides a user with a service C of the first service server 40 and a service D of the second service server 50 in response to a request from the user. Similarly, the agent B provides the user with the service C of the first service server 40 and the service D of the second service server 50 in response to a request from the user. Note that in the present embodiment, the agents A and B are collectively referred to as an "agent", and the first VPA server 20 and the second VPA server 30 are collectively referred to as a "VPA server" or an "agent server".

The service C and the service D may be the same type of services (such as music streaming service) or different types of services (for example, the service C is a music streaming service and the service D is a weather information service). Note that in the present embodiment, the services C and D are collectively referred to as a "service".

Also, although the agent system 1 in the present embodiment uses two service servers, the number of service servers may be three or more. Furthermore, in the present embodiment, the first service server 40 is a server device to provide a service C using content E, and the second service server 50 is a server device to provide a service D using content F. The content E and the content F may be the same type of content (such as music) or different types of content (for example, the content E is music and the content F is weather information). Note that in the present embodiment, the content E and F are collectively referred to as "content", and the first service server 40 and the second service server 50 are collectively referred to as a "service server".

Figure 2:
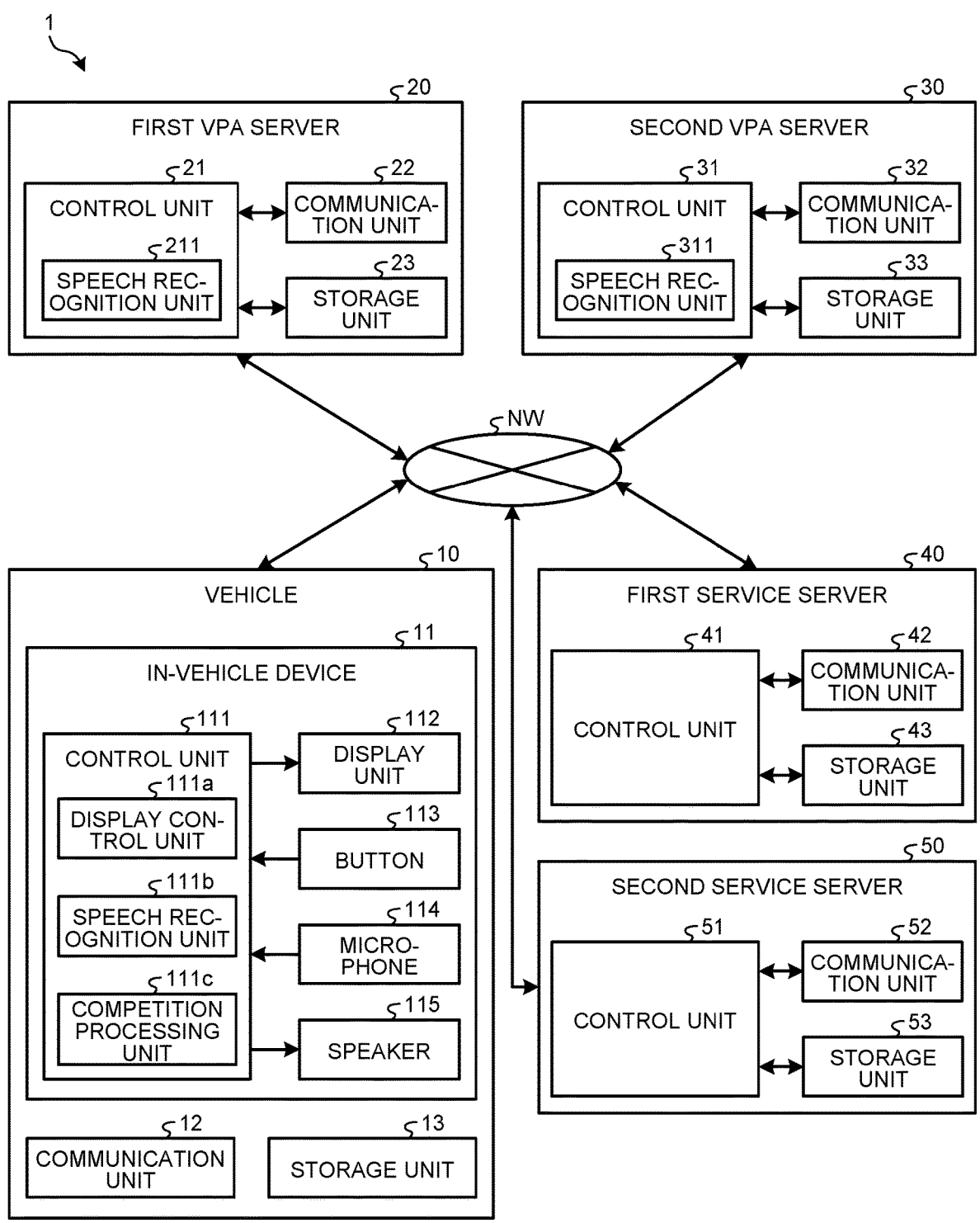
FIG. 2 is a block diagram schematically illustrating configurations of the agent system and the terminal device according to the embodiment.

As illustrated in FIG. 2, the vehicle 10 includes an in-vehicle device 11, a communication unit 12, and a storage unit 13. The in-vehicle device 11 is a car navigation device mounted on the vehicle 10, for example. The in-vehicle device 11 includes a control unit 111, a display unit (display) 112, a button 113, a microphone 114, and a speaker 115.

More specifically, the control unit 111 includes a processor including a central processing unit (CPU), a digital signal processor (DSP), a field-programmable gate array (FPGA), and the like, and a memory (main storage unit) including a random access memory (RAM), a read only memory (ROM), and the like.

The control unit 111 realizes a function that meets a predetermined purpose by loading and executing a program, which is stored in the storage unit 13, in a work area of the main storage unit, and controlling each configuration unit and the like through execution of the program. The control unit 111 functions as a display control unit 111a, a speech recognition unit 111b, and a competition processing unit 111c through execution of the program stored in the storage unit 13.

The display control unit 111a controls display contents of the display unit 112. Based on an operation by a user, the display control unit 111a causes the display unit 112 to display a screen corresponding to the operation. Also, the display control unit 111a causes the display unit 112 to display content data input from the first service server 40 and the second service server 50 in response to a request from the user. Examples of the "content data" include music, weather information, and the like.

The speech recognition unit 111b is a speech recognition engine that performs automatic speech recognition (ASR) processing and natural language understanding (NLU).

The speech recognition unit 111b detects speech of a user and recognizes spoken contents based on spoken voice of the user which voice is input from the microphone 114. Subsequently, the speech recognition unit 111b determines to which agent between the agents A and B an instruction included in the spoken voice of the user is given. Then, the speech recognition unit 111b transfers the spoken voice of the user to an agent server (first VPA server 20 or second VPA server 30) that realizes a function of the determined agent. Next, the speech recognition unit 111b acquires content data from a service server (first service server 40 or second service server 50).

More specifically, the speech recognition unit 111b converts the spoken voice of the user into text data, determines that an instruction is to an agent when a phrase identifying the agent is included in the text data. Here, the "phrase identifying the agent" indicates a wake up phrase (WuP) to call the agent. Note that the wake up phrase is also called a "wake word".

When execution of another subsequent content (such as weather information) is requested by the user during execution of first content (such as music) acquired from a certain service server (such as first service server 40), the competition processing unit 111c acquires the subsequent content from a service server (such as first service server 40) that manages the subsequent content. Then, the competition processing unit 111c determines whether to execute the two types of content based on a competition processing policy set in advance.

As the competition processing policy, for example, priority among types of content that may compete against each other in each agent is determined in advance by a matrix or the like. Also, the competition processing policy is determined by setting of execution priority for each content type (such as binary file or streaming data).

More specifically, the competition processing unit 111c first executes one of the first content and the subsequent content and then executes the other of the first content and the subsequent content based on the competition processing policy. As a result, for example, since the subsequent content is not executed in a superimposed manner during execution of the first content (for example, sound of weather information is not played simultaneously while certain music is played), a plurality of services may be used without competition against each other.

The display unit 112 includes, for example, a liquid crystal display (LCD), an organic EL display (GELD), or the like, and displays information under the control of the display control unit 111a. The button 113 is a button pressed by the user in speaking. The button 113 includes, for example, a push-type physical push button provided on a steering wheel or the like of the vehicle 10, or a virtual push button displayed on the display unit 112.

Here, there is a plurality of calling methods (starting method) for an agent in the present embodiment. For example, in a case of instructing the agent B (second VPA server 30) to provide weather information, the user speaks in a manner of (1) and (2) in the following.

(1) Speak "agent B, tell me the weather today".

(2) Press button 113 and speak "tell me the weather today".

(1) is a method of using a wake up phrase. The user speaks a phrase including a phrase identifying the agent B and an instruction for the agent B.

(2) is a method of using the button 113 instead of the wakeup phrase. Note that "pressing the button 113 and speaking" includes two patterns that are a case of pressing the button 113 and starting speaking after a release of the button (push-to-talk/tap-to-talk), and a case of speaking with the button 113 being kept pressed and releasing the button 113 after the speech is over (hold-to-talk). In such a manner, it is possible to omit the wake up phrase by pressing the button 113 and speaking.

Also, when using an agent, it is possible to call another agent through a certain agent. For example, in a case of instructing the agent B (second VPA server 30) to provide weather information through the agent A (first VPA server 20), the user speaks in a manner of (3) in the following.

(3) Speak "agent A and agent B, tell me the weather today".

The microphone 114 is an input unit that receives a speech input from the user. The microphone 114 is used, for example, when the user gives an instruction for an agent (VPA server). The speaker 115 is an output unit that outputs sound to the user. The speaker 115 is used when the agent responds to the user based on an instruction from the user, for example.

The communication unit 12 includes, for example, a data communication module (DCM) and the like, and performs communication with the first VPA server 20, the second VPA server 30, the first service server 40, and the second service server 50 by wireless communication through the network NW.

The storage unit 13 includes a recording medium such as an erasable programmable ROM (EPROM), a hard disk drive (HDD), or a removable medium. Examples of the removable medium include a universal serial bus (USB) memory, and disc recording media such as a compact disc (CD), a digital versatile disc (DVD), and a Blu-ray (registered trademark) disc (BD). Also, the storage unit 13 may store an operating system (OS), various programs, various tables, various databases, and the like. When necessary, the storage unit 13 stores, for example, data of interaction contents of the user, data of a recognition result of spoken voice of the user, and the like.

The first VPA server 20 includes a control unit 21, a communication unit 22, and a storage unit 23. Physical configurations of the communication unit 22 and the storage unit 23 are similar to those of the communication unit 12 and the storage unit 13.

More specifically, the control unit 21 includes a processor including a central processing unit (CPU), a digital signal processor (DSP), a field-programmable gate array (FPGA), and the like, and a memory (main storage unit) including a random access memory (RAM), a read only memory (ROM), and the like. The control unit 21 realizes a function of a speech interaction agent by executing a program of the speech interaction agent which program is stored in the storage unit 23. The control unit 21 also functions as a speech recognition unit 211 through execution of a program stored in the storage unit 23.

The speech recognition unit 211 has a function similar to that of the speech recognition unit 111b, and recognizes spoken voice of a user, which voice is transferred from the in-vehicle device 11, by converting the spoken voice of the user into text data. Then, the speech recognition unit 211 causes the first service server 40 or the second service server 50 to output content data to the in-vehicle device 11 in response to a request included in the spoken voice of the user.

The speech recognition unit 211 may accumulate interaction contents of a user as preference information of the user in the storage unit 23, and may perform processing in consideration of the preference information of the user when performing processing based on a recognition result of spoken voice of the user which voice is transferred from the in-vehicle device 11. For example, when the user frequently instructs the agent A to play music of a specific genre (such as classical music), the speech recognition unit 211 accumulates information "a favorite music genre of the user: classical music" as preference information in the storage unit 23. Then, when the user instructs the agent A to "play music", the speech recognition unit 211 causes the first service server 40 or the second service server 50 to output classical music streaming data to the in-vehicle device 11. As a result, it is possible to improve convenience since a service that suits a preference of the user may be received.

The storage unit 23 stores a program of a speech interaction agent realized by the first VPA server 20. Also, when necessary, the storage unit 23 stores, for example, data of interaction contents of the user, data of a recognition result of spoken voice of the user, and the like. Note that these pieces of information may be deleted from the storage unit 23 after use from a viewpoint of privacy protection.

The second VPA server 30 includes a control unit 31, a communication unit 32, and a storage unit 33. Physical configurations of the control unit 31, the communication unit 32, and the storage unit 33 are similar to those of the control unit 21, the communication unit 12, and the storage unit 13. The control unit 31 realizes a function of a speech interaction agent by executing a program of the speech interaction agent which program is stored in the storage unit 33. The control unit 31 also functions as a speech recognition unit 311 through execution of a program stored in the storage unit 33.

The speech recognition unit 311 has a function similar to that of the speech recognition unit 111b, and recognizes spoken voice of a user, which voice is transferred from the in-vehicle device 11, by converting the spoken voice of the user into text data. Then, the speech recognition unit 311 causes the first service server 40 or the second service server 50 to output content data to the in-vehicle device 11 in response to a request included in the spoken voice of the user. Also, similarly to the speech recognition unit 211, the speech recognition unit 311 may accumulate interaction contents of a user as preference information of the user in the storage unit 33, and may perform processing in consideration of the preference information of the user when performing processing based on a recognition result of spoken voice of the user which voice is transferred from the in-vehicle device 11. As a result, it is possible to improve convenience since a service that suits a preference of the user may be received.

The storage unit 33 stores a program of a speech interaction agent realized by the second VPA server 30. Also, when necessary, the storage unit 33 stores, for example, data of interaction contents of the user, data of a recognition result of spoken voice of the user, and the like. Note that these pieces of information may be deleted from the storage unit 33 after use from a viewpoint of privacy protection.

The first service server 40 is a server device that manages content, and outputs content data to the in-vehicle device 11 under control of the first VPA server 20 or the second VPA server 30. The first service server 40 includes a control unit 41, a communication unit 42, and a storage unit 43. Physical configurations of the control unit 41, the communication unit 42, and the storage unit 43 are similar to those of the control unit 21, the communication unit 12, and the storage unit 13.

The second service server 50 is a server device that manages content, and outputs content data to the in-vehicle device 11 under control of the first VPA server 20 or the second VPA server 30. The second service server 50 includes a control unit 51, a communication unit 52, and a storage unit 53. Physical configurations of the control unit 51, the communication unit 52, and the storage unit 53 are similar to those of the control unit 21, the communication unit 12, and the storage unit 13.

Figure 3:
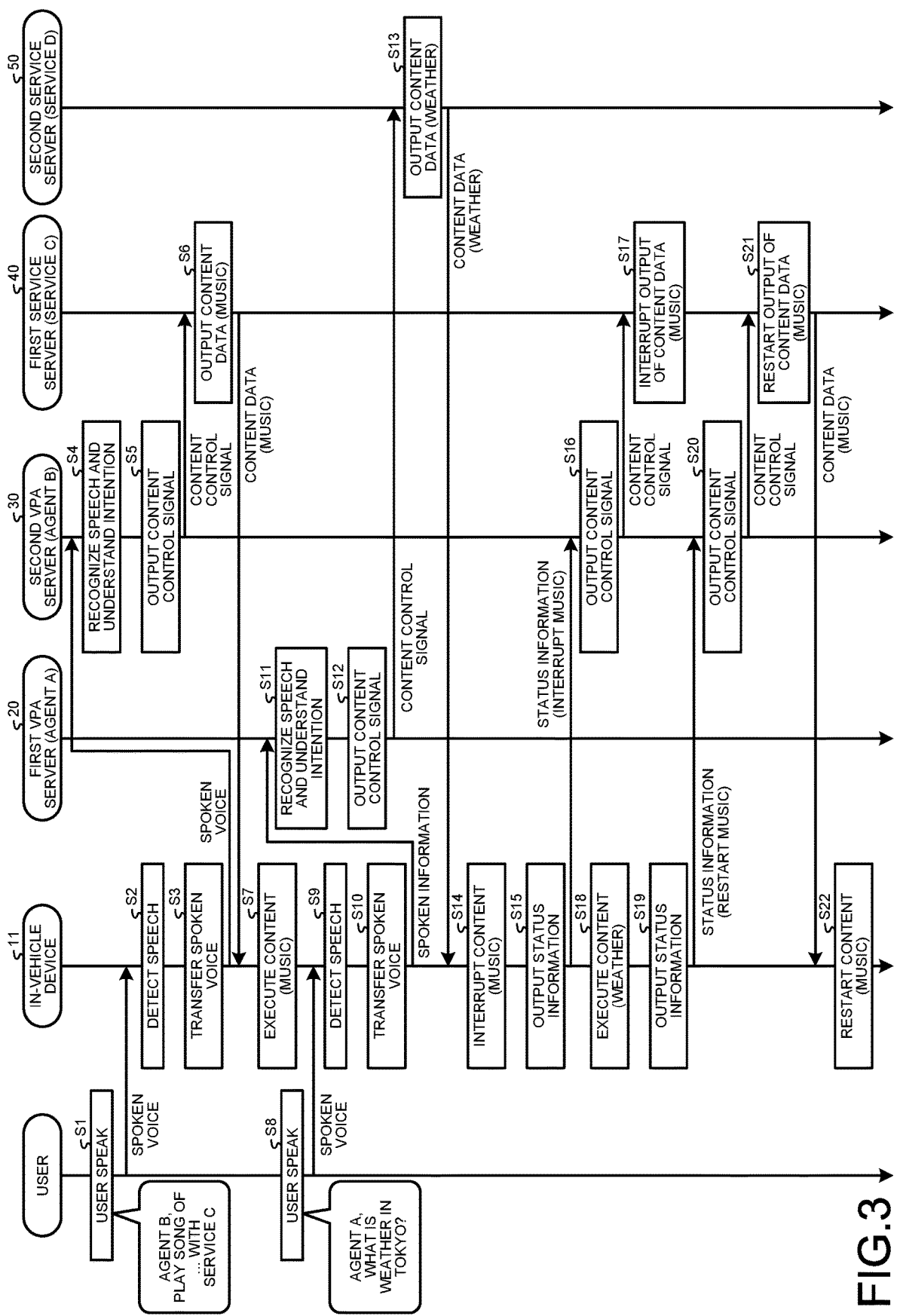
FIG. 3 is a flowchart illustrating an example of a processing procedure of a speech interaction method executed by the agent system, the terminal device, and an agent program according to the embodiment.

A processing procedure of the speech interaction method executed by the agent system 1 and the terminal device according to the present embodiment will be described with reference to FIG. 3. In the following, a speech interaction method of a case where a plurality of services is used under a competition processing policy that "content of weather information is executed preferentially compared to music content" will be described. Also, for convenience of description, a step in which a user speaks is also illustrated in a flowchart of the speech interaction method in FIG. 3.

First, when a user speaks "agent B, play the song of oo with the service C" (Step S1), data of the spoken voice is input into the in-vehicle device 11 through the microphone 114. Subsequently, the speech recognition unit 111b of the in-vehicle device 11 detects the speech of the user (Step S2), and transfers the spoken voice of the user to the second VPA server 30 (Step S3).

Subsequently, the speech recognition unit 311 of the second VPA server 30 performs speech recognition processing and intention understanding processing (Step S4). Then, the control unit 31 of the second VPA server 30 generates a content control signal based on a recognition result, and outputs the content control signal to the first service server 40 (Step S5). In response to this, the control unit 41 of the first service server 40 outputs content data (music streaming data) requested by the user to the in-vehicle device 11 (Step S6). Subsequently, the control unit 111 of the in-vehicle device 11 executes the content (music) acquired from the first service server 40 (Step S7). In this case, the control unit 111 plays music through the speaker 115.

Then, when the user speaks "agent A, what is the weather in Tokyo?" while the music is being played (Step S8), data of the spoken voice is input into the in-vehicle device 11 through the microphone 114. Subsequently, the speech recognition unit 111b detects the speech of the user (Step S9), and transfers the spoken voice of the user to the first VPA server 20 (Step S10).

Subsequently, the speech recognition unit 211 of the first VPA server 20 performs speech recognition processing and intention understanding processing (Step S11). Then, the control unit 21 of the first VPA server 20 generates a content control signal based on a recognition result, and outputs the content control signal to the second service server 50 (Step S12). In response to this, the control unit 51 of the second service server 50 outputs content data (weather information) requested by the user to the in-vehicle device 11 (Step S13).

Subsequently, the competition processing unit 111c stops the execution of the content (music) (Step S14), and outputs status information to the second VPA server 30 (Step S15). Note that the "status information" is information related to a status of content being executed in the in-vehicle device 11. For example, status information of a case of music streaming data includes information such as a song name, an album name, and a singer name with which information a song may identified, and information such as an interruption position of the song.

Subsequently, the control unit 31 generates a content control signal based on the status information, and outputs the content control signal to the first service server 40 (Step S16). In response to this, the control unit 41 interrupts the output of the content data (music streaming data) (Step S17). Subsequently, the control unit 111 executes the content (weather) acquired from the second service server 50 (Step S18). In this case, the control unit 111 presents weather information of Tokyo through the display unit 112 and the speaker 115, for example.

When the execution of the content (weather) is over, the competition processing unit 111c outputs status information to the second VPA server 30 (Step S19). Subsequently, the control unit 31 generates a content control signal based on the status information, and outputs the content control signal to the first service server 40 (Step S20). In response to this, the control unit 41 restarts the output of the content data (music streaming data) (Step S21). Subsequently, the control unit 111 restarts the execution of the content (music) acquired from the first service server 40 (Step S22).

Here, a conventional agent system has a design in which an interruption to content, such as lowering a volume of music and playing a sound of weather information, is considered when a plurality of services is simultaneously used in a single agent (such as a case where a weather information service of an agent A is used while music streaming of the agent A is used). However, in the conventional agent system, a case of using a plurality of services across a plurality of agents (such as a case of using a weather information service of an agent B while using music streaming of an agent A) is not assumed. Thus, in the conventional agent system, there are problems such that sounds of a plurality of types of content are output in a superimposed manner, and a state mismatch between a server of each agent and a client is generated.

On the one hand, according to the agent system 1, the terminal device, and the agent program of the present embodiment, processing with which first and subsequent content does not compete against each other is performed when execution of another content is requested by a user during execution of certain content. Thus, even when a plurality of services is used through a plurality of agents, it is possible to simultaneously use the plurality of services across the plurality of agents without causing the services to compete against each other.

For example, in the agent system 1, the terminal device, and the agent program according to the embodiment, the first VPA server 20 and the first service server 40 are described as separate configurations. However, a first VPA server 20 and a first service server 40 may be configured as one. Similarly, in the agent system 1, the terminal device, and the agent program according to the embodiment, the second VPA server 30 and the second service server 50 are described as separate configurations. However, a second VPA server 30 and a second service server 50 may be configured as one.

According to the present disclosure, it is possible to simultaneously use, even when a plurality of services is used through a plurality of speech interaction agents, the plurality of services across the plurality of speech interaction agents without causing the services to compete against each other.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An agent system comprising:
a first server comprising a first processor comprising hardware, the first processor being configured to output first content to a terminal device in response to a request from a user;
a second server comprising a second processor comprising hardware, the second processor being configured to output second content to the terminal device in response to a request from the user; and
a third server comprising a third processor comprising hardware, the third processor being configured to
acquire the second content from the second server when execution of the second content is requested by the user during execution of the first content acquired from the first server, and
based on a competition processing policy set in advance,
interrupt execution of the first content, execute the second content, and restart the execution of the first content after completion of the execution of the second content, or
execute the second content after completion of the execution of the first content.

2. The agent system according to claim 1, wherein the third processor is configured to:
acquire the second content from the second server when execution of the second content is requested by the user during execution of the first content acquired from the first server; and
execute one of the first content and the second content first and then execute another one of the first content and the second content based on the competition processing policy.

3. The agent system according to claim 1, wherein the competition processing policy is determined by setting of execution priority for each type of content.

4. The agent system according to claim 1, wherein
the first server comprises:
  a first service server configured to manage the first content; and
  a first agent server configured to recognize spoken voice of the user and cause the first service server to output the first content to the terminal device in response to a request included in the spoken voice of the user, and
the second server comprises:
  a second service server configured to manage the second content; and
  a second agent server configured to recognize spoken voice of the user and cause the second service server to output the second content to the terminal device in response to a request included in the spoken voice of the user.

5. The agent system according to claim 4, wherein the first processor and the second processor are configured to recognize the spoken voice of the user by converting the spoken voice of the user into text data.

6. The agent system according to claim 4, wherein the spoken voice of the user includes a phrase identifying a speech interaction agent corresponding to the first agent server or the second agent server, and an instruction for the speech interaction agent.

7. The agent system according to claim 6, wherein the terminal device comprises a button pressed by the user in speaking.

8. The agent system according to claim 1, wherein the terminal device is an in-vehicle device mounted on a vehicle.

9. The agent system according to claim 1, wherein the terminal device is an information terminal device owned by the user.

10. A terminal device comprising:
  a processor comprising hardware, wherein the processor is configured to:
    acquire second content from a second server when execution of the second content is requested by a user during execution of first content acquired from a first server; and
    based on a competition processing policy set in advance,
      interrupt execution of the first content, execute the second content, and restart the execution of the first content after completion of the execution of the second content, or
      execute the second content after completion of the execution of the first content.

11. The terminal device according to claim 10, wherein the processor is configured to:
  acquire the second content from the second server when execution of the second content is requested by the user during execution of the first content acquired from the first server; and
  execute one of the first content and the second content first and then execute the other of the first content and the second content based on the competition processing policy.

12. The terminal device according to claim 10, wherein the competition processing policy is determined by setting of execution priority for each type of content.

13. The terminal device according to claim 10, wherein spoken voice of the user includes a phrase identifying a speech interaction agent corresponding to the first server or the second server, and an instruction for the speech interaction agent.

14. The terminal device according to claim 13, further comprising a button pressed by the user in speaking.

15. The terminal device according to claim 10, wherein the terminal device is an in-vehicle device mounted on a vehicle.

16. The terminal device according to claim 10, wherein the terminal device is an information terminal device owned by the user.

17. A non-transitory computer-readable recording medium on which an executable program is recorded, the program causing a processor of a computer to execute:
  acquiring second content from a second server when execution of the second content is requested by a user during execution of first content acquired from a first server; and
  based on a competition processing policy set in advance,
    interrupt execution of the first content, execute the second content, and restart the execution of the first content after completion of the execution of the second content, or
    execute the second content after completion of the execution of the first content.

18. The non-transitory computer-readable recording medium according to claim 17, wherein the program causes the processor to execute:
  acquiring the second content from the second server when execution of the second content is requested by the user during execution of the first content acquired from the first server; and
  executing one of the first content and the second content first and then executing the other of the first content and the second content based on the competition processing policy.

19. The non-transitory computer-readable recording medium according to claim 17, wherein the competition processing policy is determined by setting of execution priority for each type of content.

20. The non-transitory computer-readable recording medium according to claim 17, wherein spoken voice of the user includes a phrase identifying a speech interaction agent corresponding to the first server or the second server, and an instruction for the speech interaction agent.

* * * * *